(12) United States Patent  (10) Patent No.: US 7,899,300 B2
Wakileh et al.  (45) Date of Patent: Mar. 1, 2011

(54) DUST CAPS FOR FIBER OPTIC CONNECTORS

(75) Inventors: George I. Wakileh, Batavia, IL (US); Eduardo Leon, Woodridge, IL (US); Simon Shen-Meng Chen, Palatine, IL (US)

(73) Assignee: Emerson Network Power, Energy Systems, North America, Inc., Warrenville, IL (US)

( * ) Notice: Subject to any disclaimer, the term of this patent is extended or adjusted under 35 U.S.C. 154(b) by 0 days.

(21) Appl. No.: 12/477,689

(22) Filed: Jun. 3, 2009

(65) Prior Publication Data

US 2010/0310226 A1  Dec. 9, 2010

(51) Int. Cl.
  *G02B 6/00* (2006.01)
  *G02B 6/36* (2006.01)
(52) U.S. Cl. .......................... 385/139; 385/53
(58) Field of Classification Search ................. 385/139, 385/53
  See application file for complete search history.

(56) References Cited

U.S. PATENT DOCUMENTS

| | | | |
|---|---|---|---|
| 6,068,503 A | 5/2000 | Gerke et al. | |
| 6,547,450 B2 * | 4/2003 | Lampert | 385/78 |
| 6,983,095 B2 | 1/2006 | Reagan et al. | |
| 7,103,255 B2 | 9/2006 | Reagan et al. | |
| 7,146,089 B2 | 12/2006 | Reagan et al. | |
| 7,167,628 B2 | 1/2007 | Beck | |
| 7,171,102 B2 | 1/2007 | Reagan et al. | |
| 7,186,038 B2 | 3/2007 | Hovland et al. | |
| 7,190,874 B1 | 3/2007 | Barth et al. | |
| 7,194,181 B2 | 3/2007 | Holmberg et al. | |
| 7,198,409 B2 | 4/2007 | Smith et al. | |
| 7,200,317 B2 | 4/2007 | Reagan et al. | |
| 7,209,629 B2 | 4/2007 | Bianchi et al. | |
| 7,218,827 B2 | 5/2007 | Vongseng et al. | |
| 7,233,731 B2 | 6/2007 | Solheid et al. | |
| 7,277,620 B2 * | 10/2007 | Vongseng et al. | 385/135 |
| 7,295,747 B2 | 11/2007 | Solheid et al. | |
| 7,352,945 B2 | 4/2008 | Holmberg et al. | |
| 7,352,948 B2 | 4/2008 | Beck | |
| 7,369,741 B2 | 5/2008 | Reagan et al. | |
| 7,376,322 B2 | 5/2008 | Zimmel et al. | |
| 7,394,964 B2 | 7/2008 | Tinucci et al. | |
| 7,400,813 B2 | 7/2008 | Zimmel | |
| 7,400,816 B2 | 7/2008 | Reagan et al. | |
| 7,407,330 B2 | 8/2008 | Smith et al. | |

(Continued)

*Primary Examiner*—Ryan Lepisto
*Assistant Examiner*—Eric Wong
(74) *Attorney, Agent, or Firm*—Harness, Dickey & Pierce, P.L.C.

(57) ABSTRACT

A dust cap for a fiber optic connector is disclosed. The fiber optic connector includes a connector body having a first end and second end and a ferrule positioned at the first end of the connector body. The ferrule holds an optical fiber having an end face. The dust cap includes a housing adapted to engage the first end of the connector body to releasably couple the dust cap to the fiber optic connector and protect the end face of the optical fiber. Additionally, or alternatively, the dust cap may be configured to releasably engage an adjacent dust cap to join at least two dust caps together, and may include one or more mounting members for releasably coupling the dust cap to a support structure to thereby support the dust cap and any fiber optic connector releasably coupled to the dust cap from the support structure.

28 Claims, 13 Drawing Sheets

U.S. PATENT DOCUMENTS

| | | |
|---|---|---|
| 7,418,181 B2 | 8/2008 | Zimmel et al. |
| 7,457,503 B2 | 11/2008 | Solheid et al. |
| 7,471,869 B2 | 12/2008 | Reagan et al. |
| 7,481,585 B2 | 1/2009 | Scadden et al. |
| 7,490,994 B2 | 2/2009 | Scadden et al. |
| 7,515,805 B2 | 4/2009 | Vongseng et al. |
| 7,519,259 B2 | 4/2009 | Smith et al. |
| 7,556,437 B2 | 7/2009 | Droege |
| 7,565,053 B2 | 7/2009 | Zimmel et al. |
| 7,583,883 B2 | 9/2009 | Kowalczyk et al. |
| 7,623,749 B2 | 11/2009 | Reagan et al. |
| 2005/0220434 A1* | 10/2005 | Hsieh ......................... 385/134 |
| 2008/0008436 A1 | 1/2008 | Reagan et al. |
| 2008/0310795 A1* | 12/2008 | Parkman et al. ................ 385/60 |
| 2009/0016684 A1* | 1/2009 | Beck ........................... 385/78 |
| 2009/0074372 A1 | 3/2009 | Solheid et al. |
| 2009/0087157 A1 | 4/2009 | Smith et al. |
| 2009/0103879 A1 | 4/2009 | Tang et al. |
| 2009/0110359 A1 | 4/2009 | Smith et al. |
| 2009/0190896 A1 | 7/2009 | Smith et al. |
| 2009/0196565 A1 | 8/2009 | Vongseng et al. |

* cited by examiner

DUST CAPS FOR FIBER OPTIC CONNECTORS

FIELD

The present disclosure relates generally to dust caps for fiber optic connectors, and related methods and assemblies.

BACKGROUND

This section provides background information related to the present disclosure which is not necessarily prior art.

Fiber optic cables are increasingly used in telecommunication networks for transmitting voice, video and other data using light signals. Many fiber optic cables have a connector on one or both ends of the cable so the cable can be readily connected to another cable or fiber optic device (typically via an optical coupler, also called an optical adaptor).

Dust caps are commonly used with fiber optic connectors to protect the exposed end of an optical fiber in the connector from damage. The fiber optic connectors include a ferrule for holding the optical fiber. The dust caps typically include a housing that engages the ferrule in the connector to releasably couple the dust cap to the ferrule. In this manner, each dust cap covers the end face of an optical fiber to protect it from damage. The dust caps may be removed from the ferrules before the connectors are coupled to another cable or fiber optic device.

SUMMARY

This section provides a general summary of the disclosure, and is not a comprehensive disclosure of its full scope or all of its features.

According to one aspect of the present disclosure, a dust cap for a fiber optic connector is disclosed. The fiber optic connector includes a connector body having a first end and second end, and a ferrule positioned at the first end of the connector body. The ferrule holds an optical fiber having an end face. The dust cap includes a housing adapted to releasably engage the first end of the connector body to releasably couple the dust cap to the fiber optic connector and protect the end face of the optical fiber.

According to another aspect of the present disclosure, a dust cap is disclosed for protecting and supporting a fiber optic connector. The fiber optic connector includes a connector body having a first end and second end, and a ferrule positioned at the first end of the connector body. The ferrule holds an optical fiber having an end face. The dust cap includes a mounting member for releasably coupling the dust cap to a support structure and a housing defining a cavity having an open end sized to receive at least the ferrule and the end face of the optical fiber. The mounting member supports the dust cap and the fiber optic connector from the support structure when the dust cap is releasably coupled to the fiber optic connector with at least the ferrule and the end face of the optical fiber received in the open end of the cavity and the mounting member is releasably coupled to the support structure.

According to yet another aspect of the present disclosure, a fiber optic assembly includes a fiber optic connector and a dust cap. The fiber optic connector includes a connector body having a first end and second end, and a ferrule positioned at the first end of the connector body. The ferrule holds an optical fiber having an end face. The dust cap includes a housing releasably coupled to the first end of the connector body. The housing encloses the end face of the optical fiber to protect the end face of the optical fiber.

According to still another aspect of the present disclosure, a method of coupling an optical fiber of a fiber optic apparatus is disclosed. The fiber optic apparatus includes a support structure, at least one optical adapter, a dust cap, and a fiber optic connector having a connector body with a first end and a ferrule extending from the first end of the connector body. The ferrule holds an optical fiber having an end face. The dust cap is releasably coupled to the first end of the fiber optic connector body to protect the end face of the optical fiber. The dust cap includes a mounting member releasably engaging the support structure to support the dust cap and the fiber optic connector releasably coupled to the dust cap from the support structure. The method includes disengaging the mounting member from the support structure with the dust cap releasably coupled to the first end of the fiber optic connector body, removing the dust cap from the first end of the fiber optic connector body, and coupling the fiber optic connector to the at least one optical adapter.

It should be understood that each aspect of the present disclosure may be practiced alone or in combination with one or more other aspects without departing from the scope of this disclosure. Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A-D are various views of a dust cap according to one example embodiment of the present disclosure.

Figure 3:
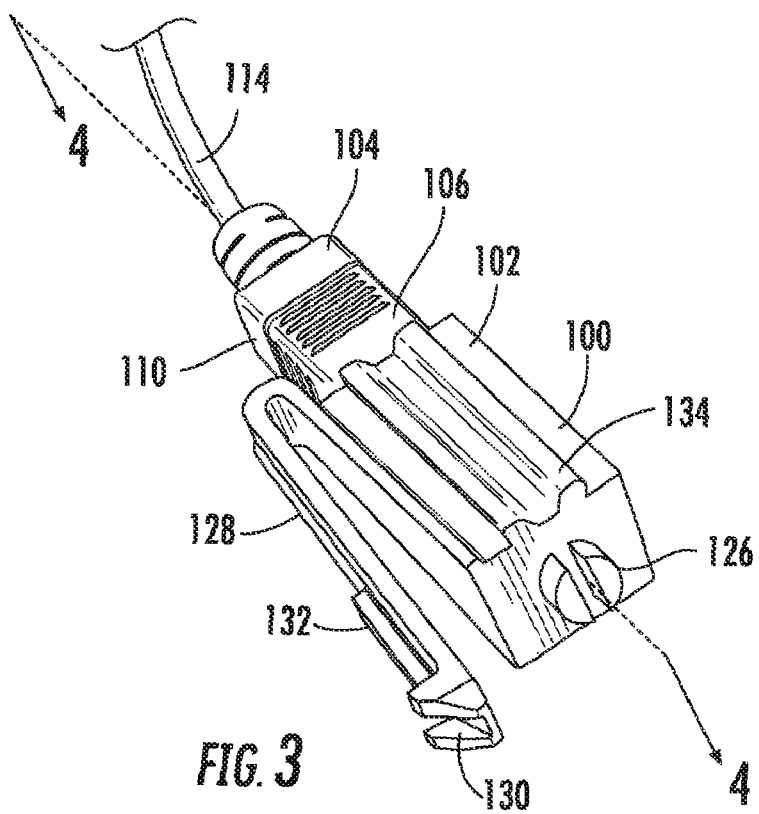
FIG. 3 is an assembled perspective view of the fiber optic assembly of FIG. 2.
Figure 5A:
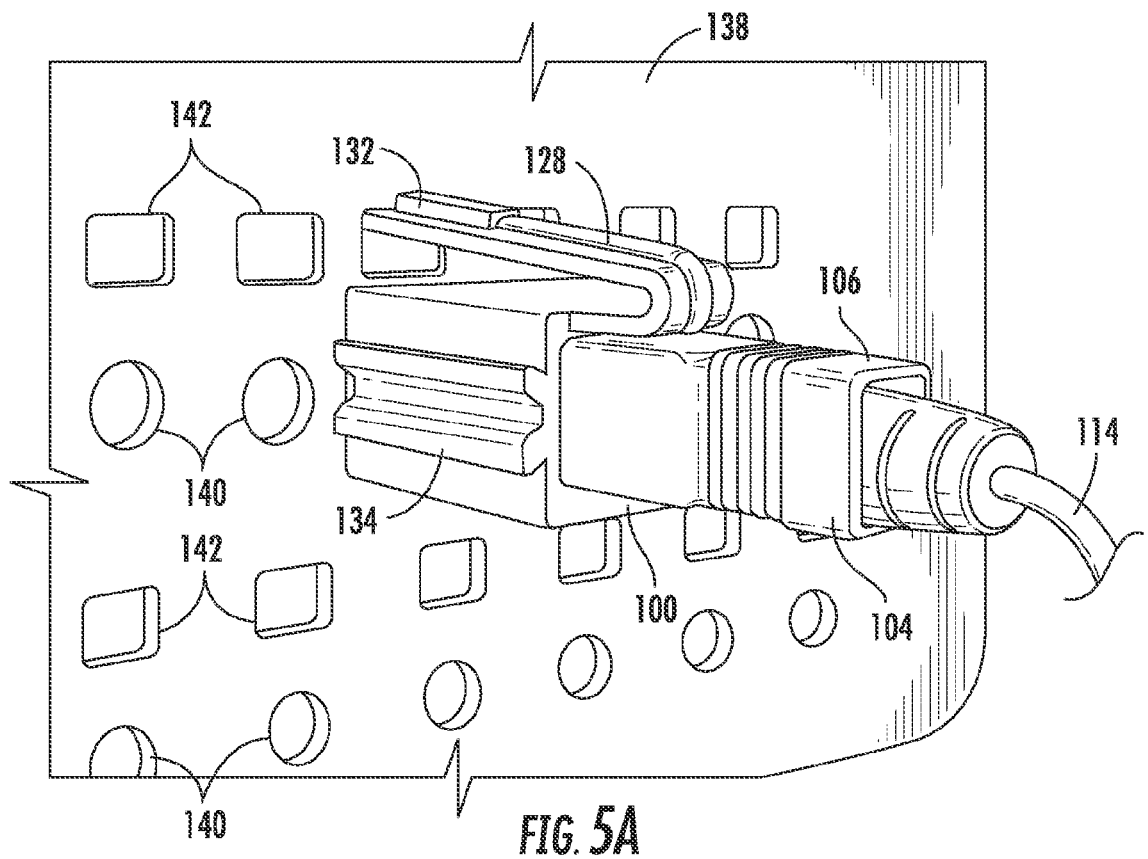
Figure 5B:
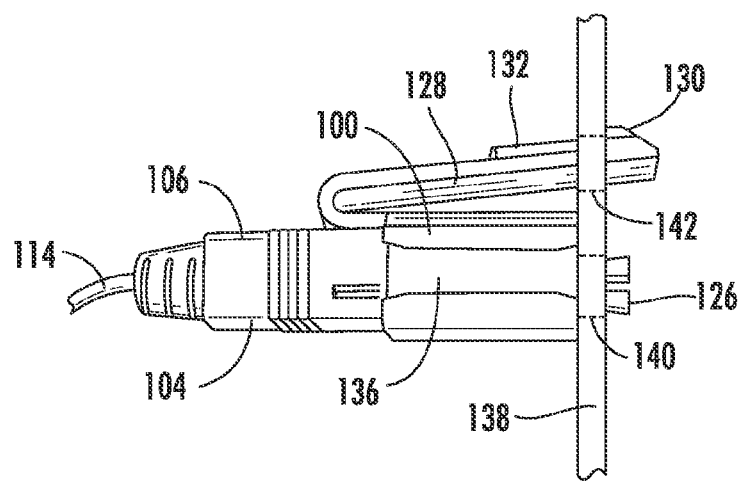

FIGS. 5A-B are views of the fiber optic assembly of FIG. 3 releasably coupled to a support structure.

Figure 6:
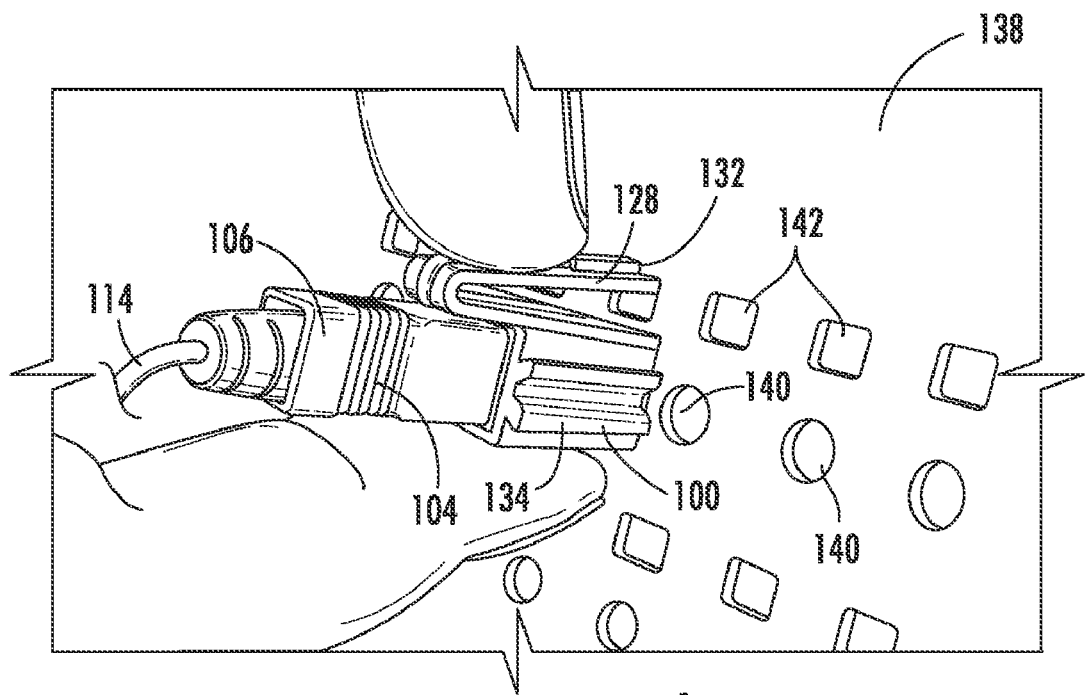

FIG. 6 is a perspective view of the fiber optic assembly of FIG. 3 as it is disengaged from a support structure.

Figure 7A:
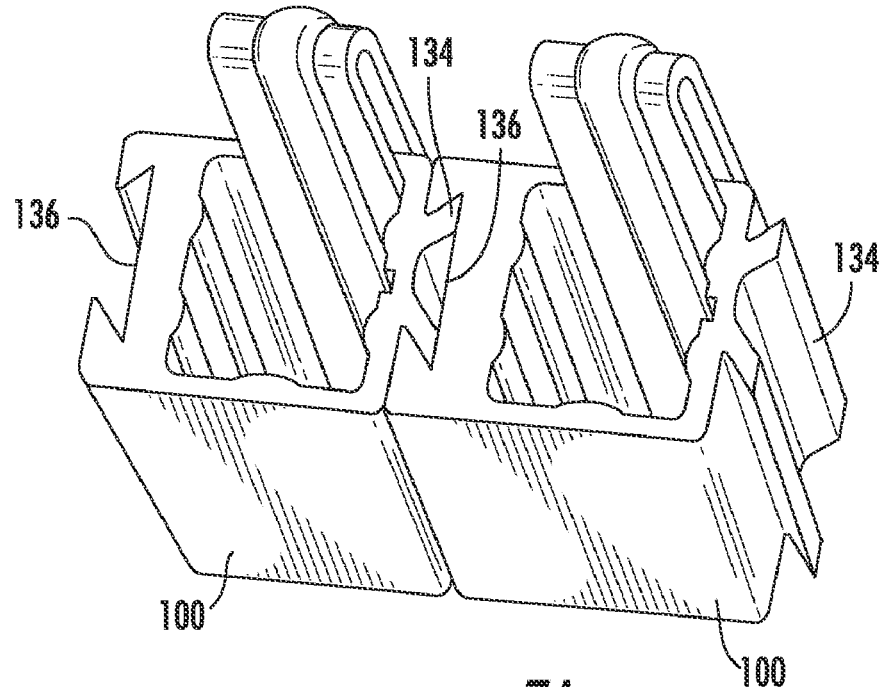

FIG. 7A is a perspective view of the dust cap of FIG. 1 coupled to an identical dust cap.

Figure 7B:
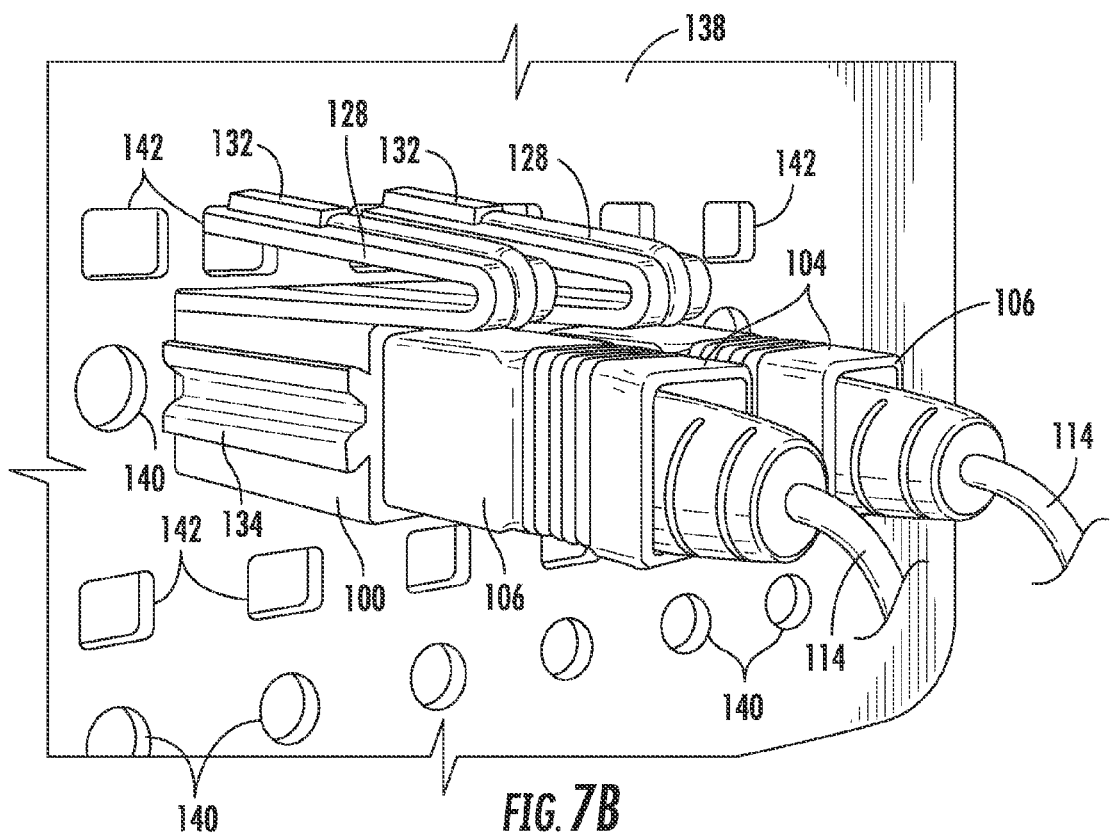

FIG. 7B is a perspective view of multiple fiber optic assemblies of FIG. 3 releasably coupled to a support structure and one another.

Figure 8:
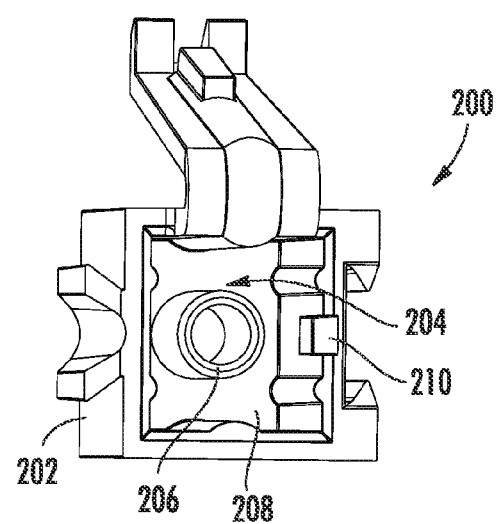

FIG. 8 is a perspective view of a dust cap according to another example embodiment of the present disclosure.

Figures 9A, 9B, 9C:
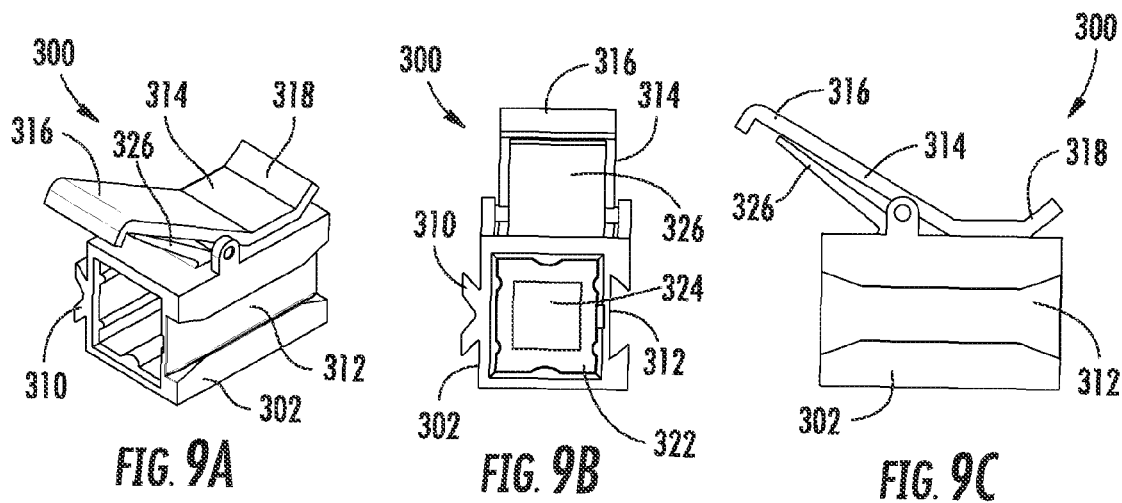

FIGS. 9A-C are views of a dust cap according to yet another example embodiment of the present disclosure.

Figure 10:
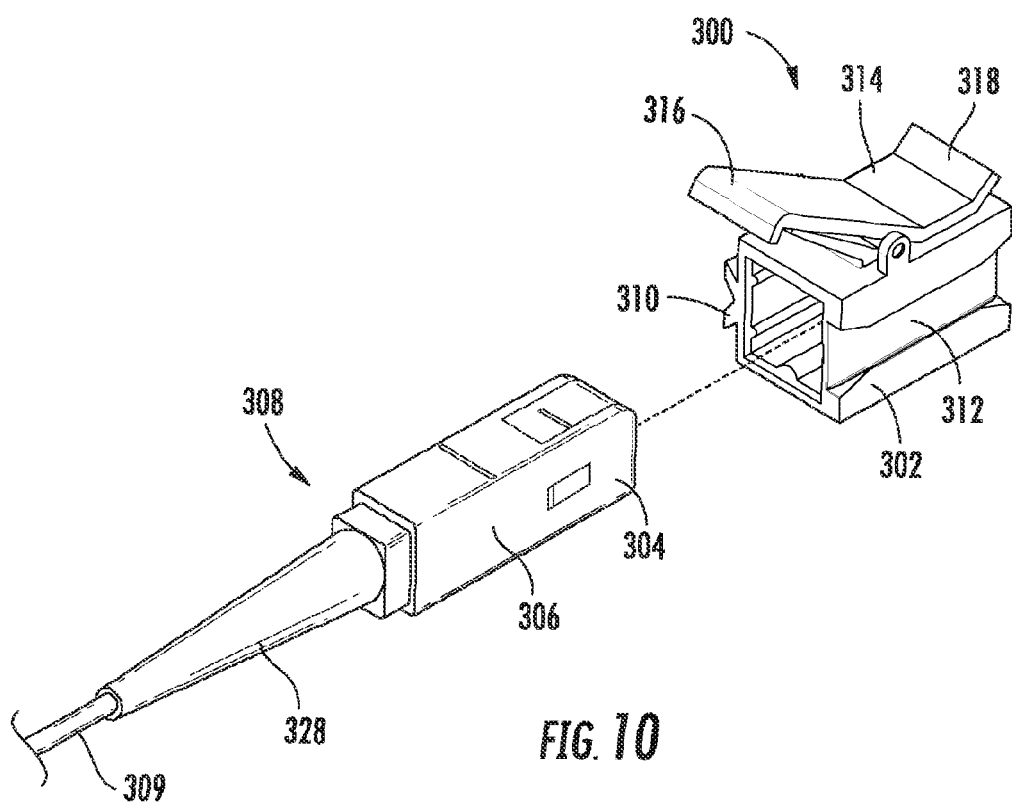

FIG. 10 is an exploded perspective view of a fiber optic assembly including the dust cap of FIG. 9.

Figure 11:
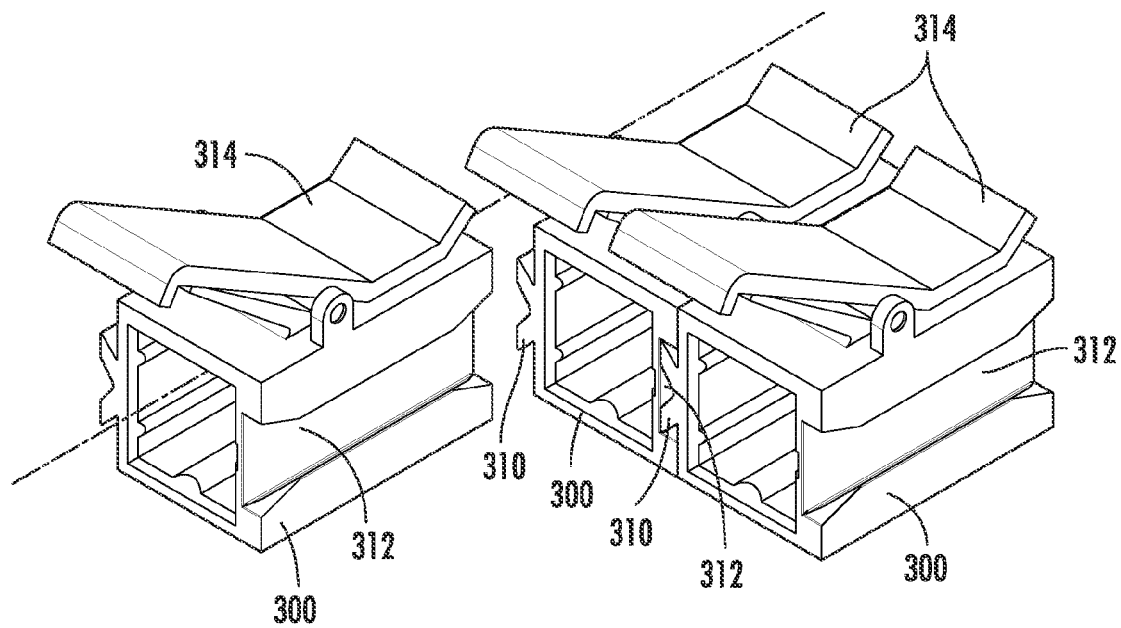

FIG. 11 is an exploded perspective view of the dust cap of FIG. 9 releasably coupled to identical dust caps.

Figure 12:
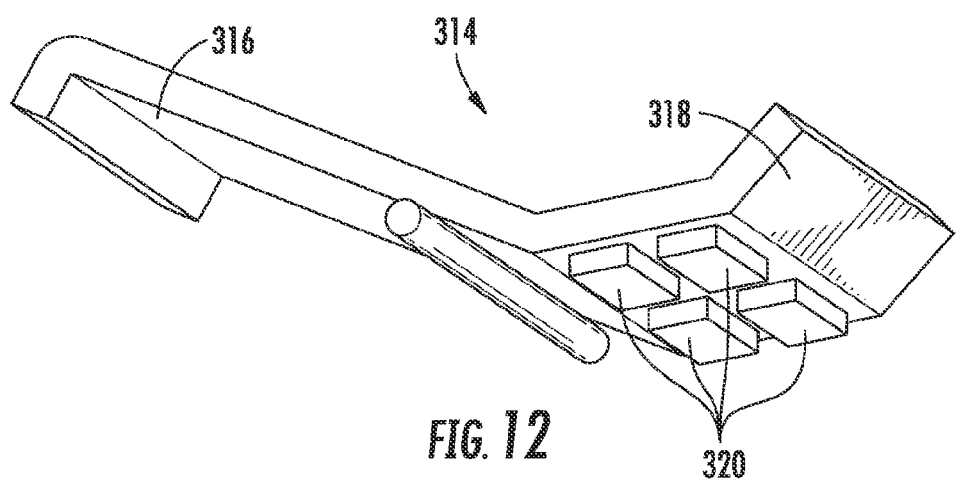

FIG. 12 is a perspective view of a mounting member of the dust cap of FIG. 9.

Figure 13:
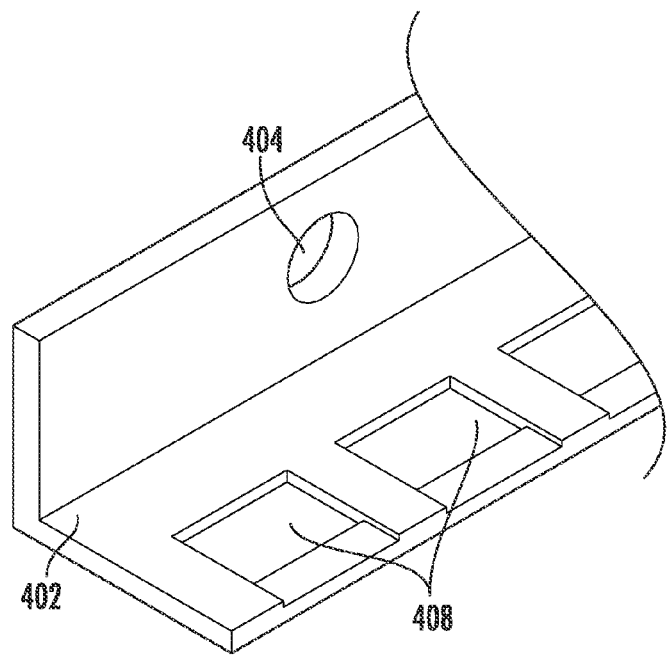

FIG. 13 is a partial perspective view of a dust cap holder.

Figure 14:
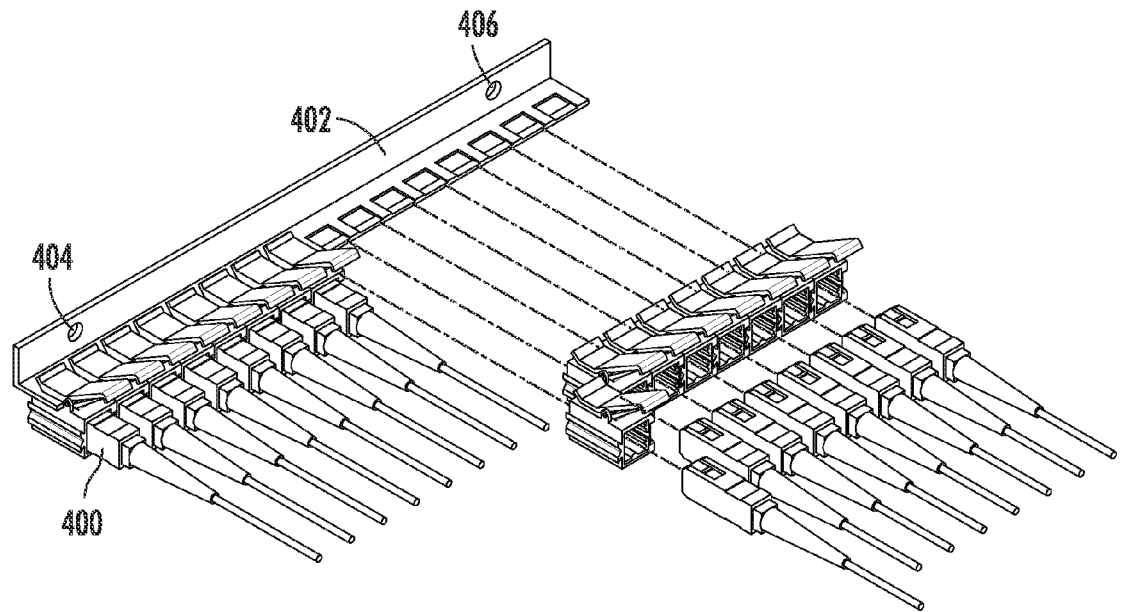

FIG. 14 is an exploded perspective view of multiple fiber optic assemblies of FIG. 10 as they are releasably coupled to the dust cap holder of FIG. 13.

Figure 15:
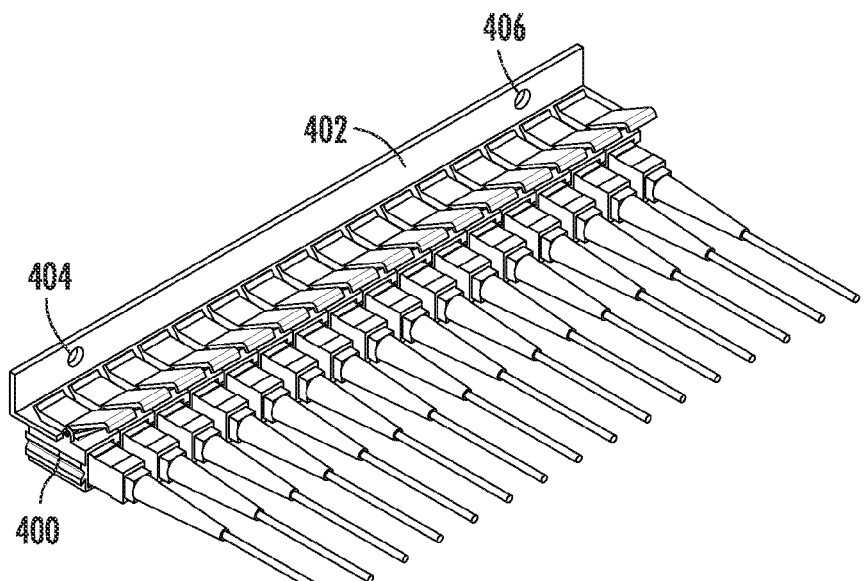

FIG. 15 is an assembled perspective view of the multiple fiber optic assemblies of FIG. 14 releasably coupled to the dust cap holder.

Figure 16:
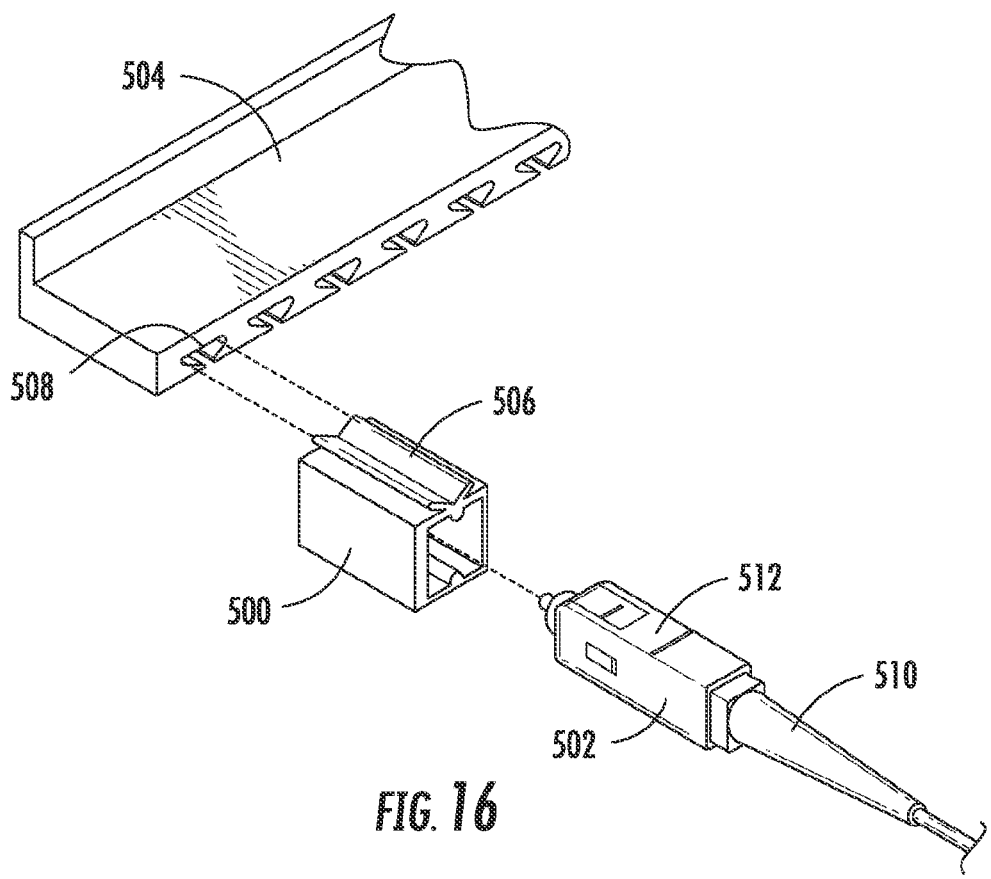

FIG. 16 is an exploded perspective view of a fiber optic assembly releasably coupled to a dust cap holder according to another example embodiment of the present disclosure.

Figure 17:
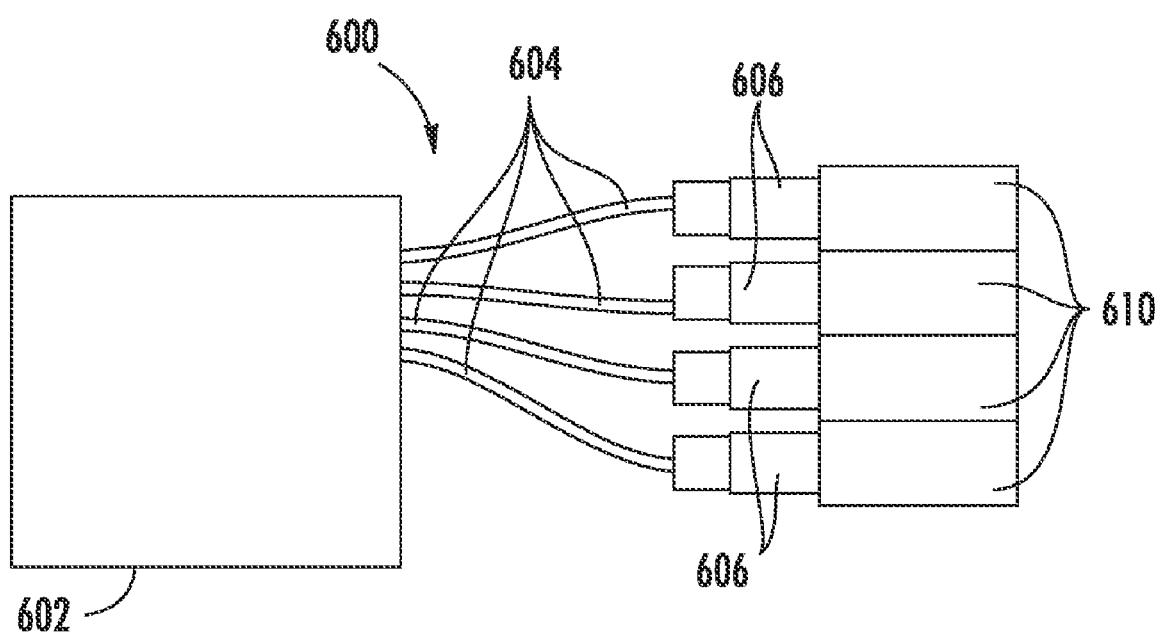

FIG. 17 is a side view of an optical module assembly according to another example embodiment of the present disclosure.

Figure 18:
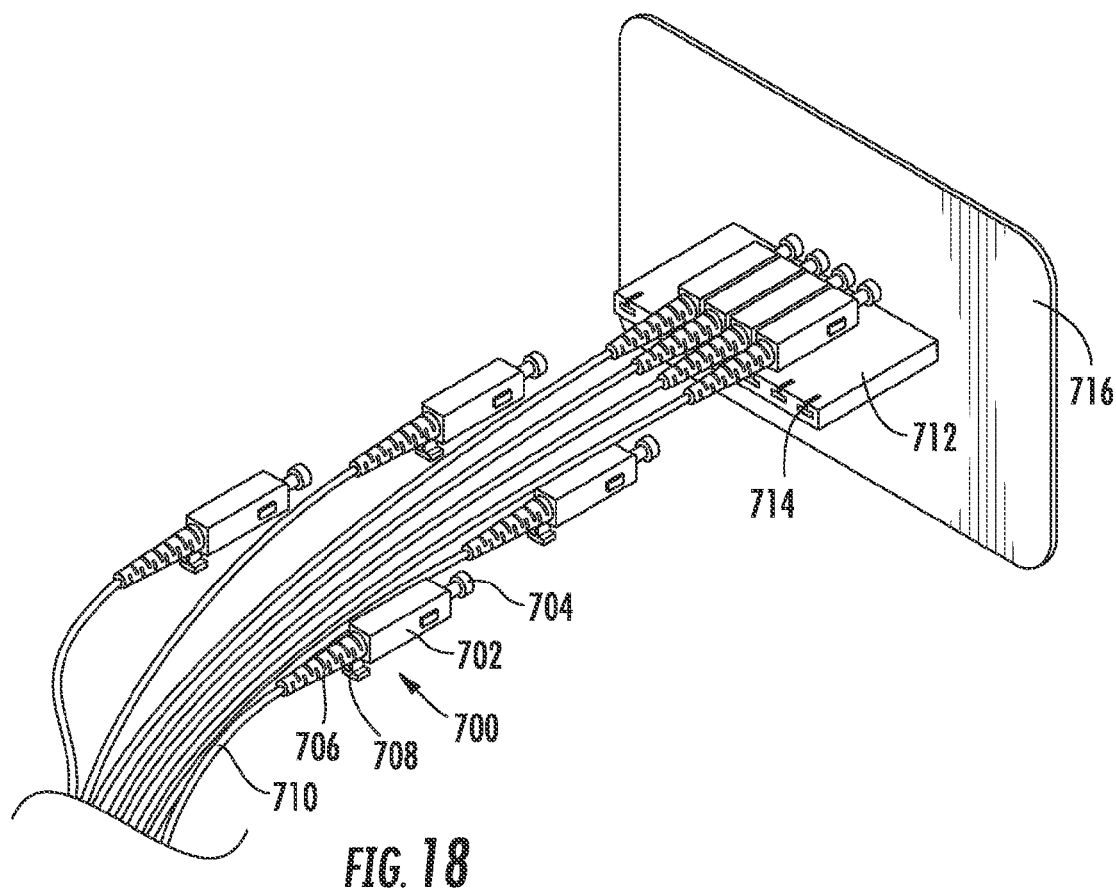

FIG. 18 is an exploded perspective view of multiple fiber optic assemblies according to yet another example embodiment of the present disclosure.

Figure 19:
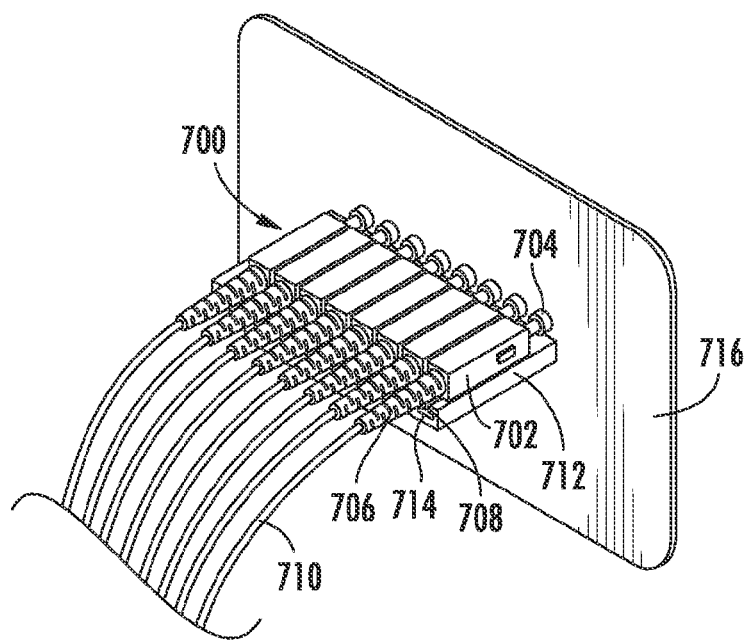

FIG. 19 is a perspective view of the multiple fiber optic assemblies of FIG. 18 releasably coupled to a holder.

DETAILED DESCRIPTION

Example embodiments will now be described more fully with reference to the accompanying drawings.

A dust cap according to one example embodiment of the present disclosure is illustrated in FIGS. 1A-D (referred to collectively as "FIG. 1") and indicated generally by reference number 100. As shown in FIG. 1, the dust cap 100 includes a housing adapted to releasably engage one end of a fiber optic connector body to releasably couple the dust cap 100 to the fiber optic connector and protect the end face of an optical fiber in the fiber optic connector. Adapting the housing 102 to engage the connector body of the fiber optic connector reduces the likelihood of contact with the end face of the optical fiber, which could damage the end face or degrade its performance, when the dust cap is coupled to the fiber optic connector.

In the particular example shown in FIG. 1, the housing 102 is adapted to releasably engage an outer surface of one end of the fiber optic connector body without contacting the end face of the optical fiber or a ferrule holding the optical fiber. As shown in FIG. 1, the housing 102 defines a cavity 120 having an open end sized to receive the outer surface of one end of the fiber optic connector body. In other embodiments, the dust cap can be adapted to releasably engage an inner or other surface(s) of the fiber optic connector body either in addition to or instead of engaging the outer surface, and the open end of the cavity 120 may be sized to receive only the end face of the optical fiber and the ferrule holding the optical fiber. Further, the housing 102 or another portion of the dust cap 100 may be adapted to releasably engage the ferrule holding the optical fiber in addition to releasably engaging the fiber optic connector body.

The dust cap 100 shown in FIG. 1 also includes mounting members to releasably engage and couple the dust cap 100—and any fiber optic connector that is releasably coupled to the dust cap 100—to a support structure. The support structure will typically be part of a fiber optic apparatus for indoor or outdoor applications, such as a fiber optic cabinet, a fiber optic pedestal, fiber optic enclosure, a fiber optic frame, etc. In the example shown in FIG. 1, the mounting members include a protuberance 126 and a biased clip 128, each of which is adapted for releasably engaging an aperture in the support structure as further explained below. Alternatively, other types of mounting members of various shapes and sizes can be employed to releasably couple the dust cap to a support structure. Although the dust cap 100 shown in FIG. 1 includes two mounting members 126, 128, more or less mounting members—or no mounting members—may be employed in other embodiments.

Additionally, the dust cap 100 shown in FIG. 1 is configured to releasably engage an adjacent dust cap to join at least two dust caps together. In particular, the housing 102 includes a tab 134 on one side and a slot 136 on an opposing side. The tab 134 is configured to releasably engage a slot in an adjacent dust cap, which may be similar or identical to dust cap 100. Likewise, the slot 136 is configured to releasably engage a tab on another adjacent dust cap, which may be similar or identical to dust cap 100. In the particular embodiment shown in FIG. 1, the tab 134 and the slot 136 have a complimentary dovetail configuration. It should be understood, however, that a variety of other structures (e.g., clips, clasps, fasteners, etc.) and techniques can be employed for releasably coupling two dust caps together without departing from the scope of this disclosure. Alternatively, a dust cap can be provided that is not configured to releasably engage an adjacent dust cap.

Further, in some embodiments of a dust cap having one or more mounting members for releasably coupling the dust cap to a support structure and/or a dust cap configured to releasably engage an adjacent dust cap, the dust cap housing may be configured not to engage the fiber optic connector body. For example, in such embodiments, the dust cap housing may engage a ferrule holding an optical fiber or otherwise cover the end face of the optical fiber without also engaging the connector body of the fiber optic connector.

The dust cap 100 shown in FIG. 1 has a monolithic construction (i.e., the dust cap 100 is cast or formed as a single part without joints). For example, the dust cap 100 shown in FIG. 1 may be formed as a single part from a thermoplastic material via injection molding. Alternatively, the dust cap 100 may be produced in two or more pieces that are subsequently combined into a single assembly.

Additionally, the dust cap 100 shown in FIG. 1 includes a key slot 148 to ensure the dust cap is coupled to the fiber optic connector in the correct orientation, as well as several ridges 150 extending into the cavity 120 for frictionally engaging complementary grooves (not shown) on the connector body of a fiber optic connector.

Figure 1A:
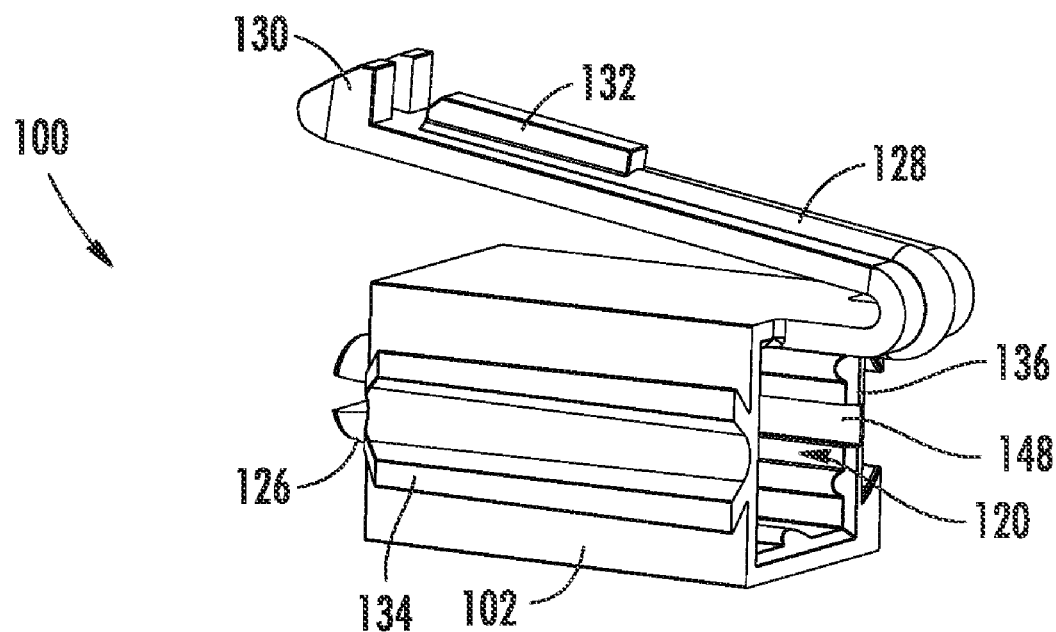
Figure 1B:
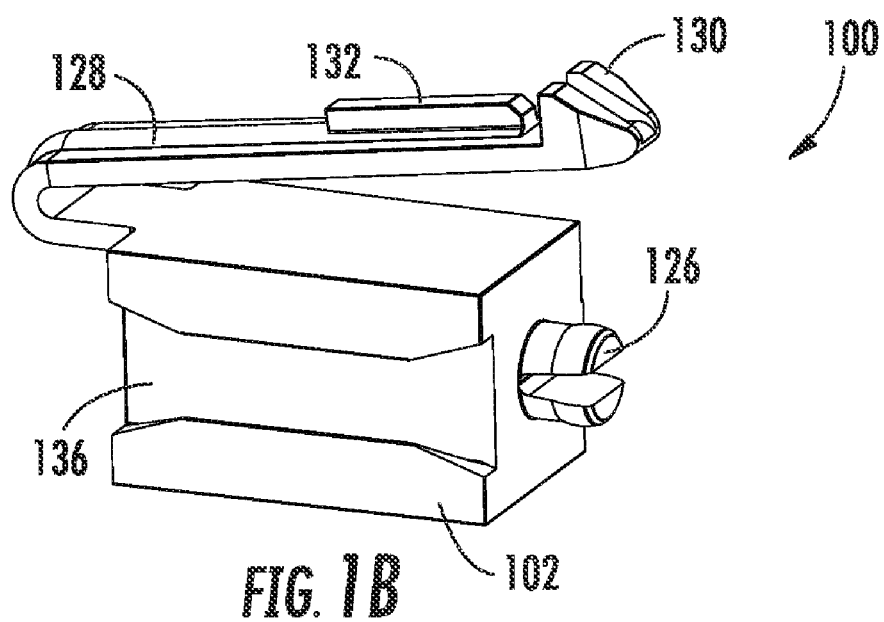
Figure 1C:
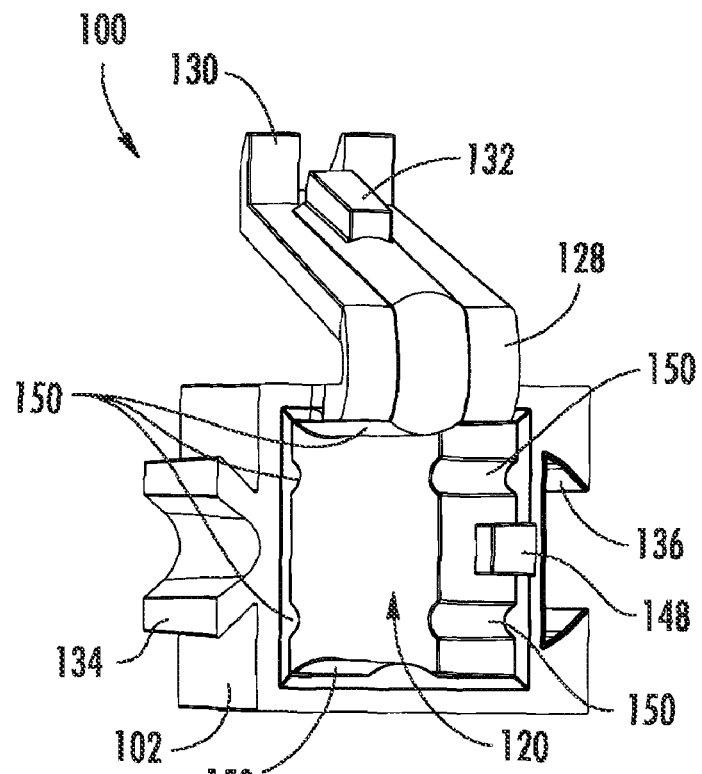
Figure 1D:
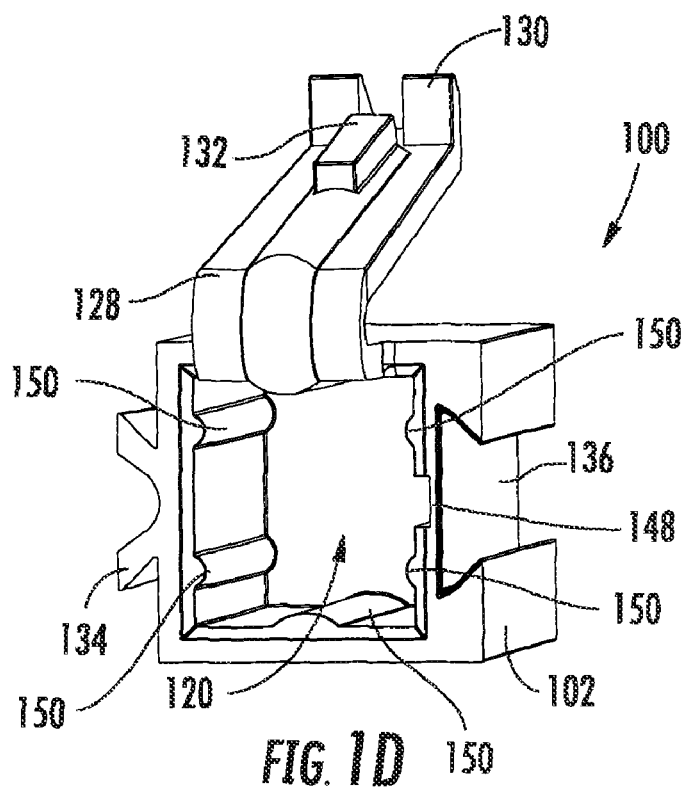
Figure 2:
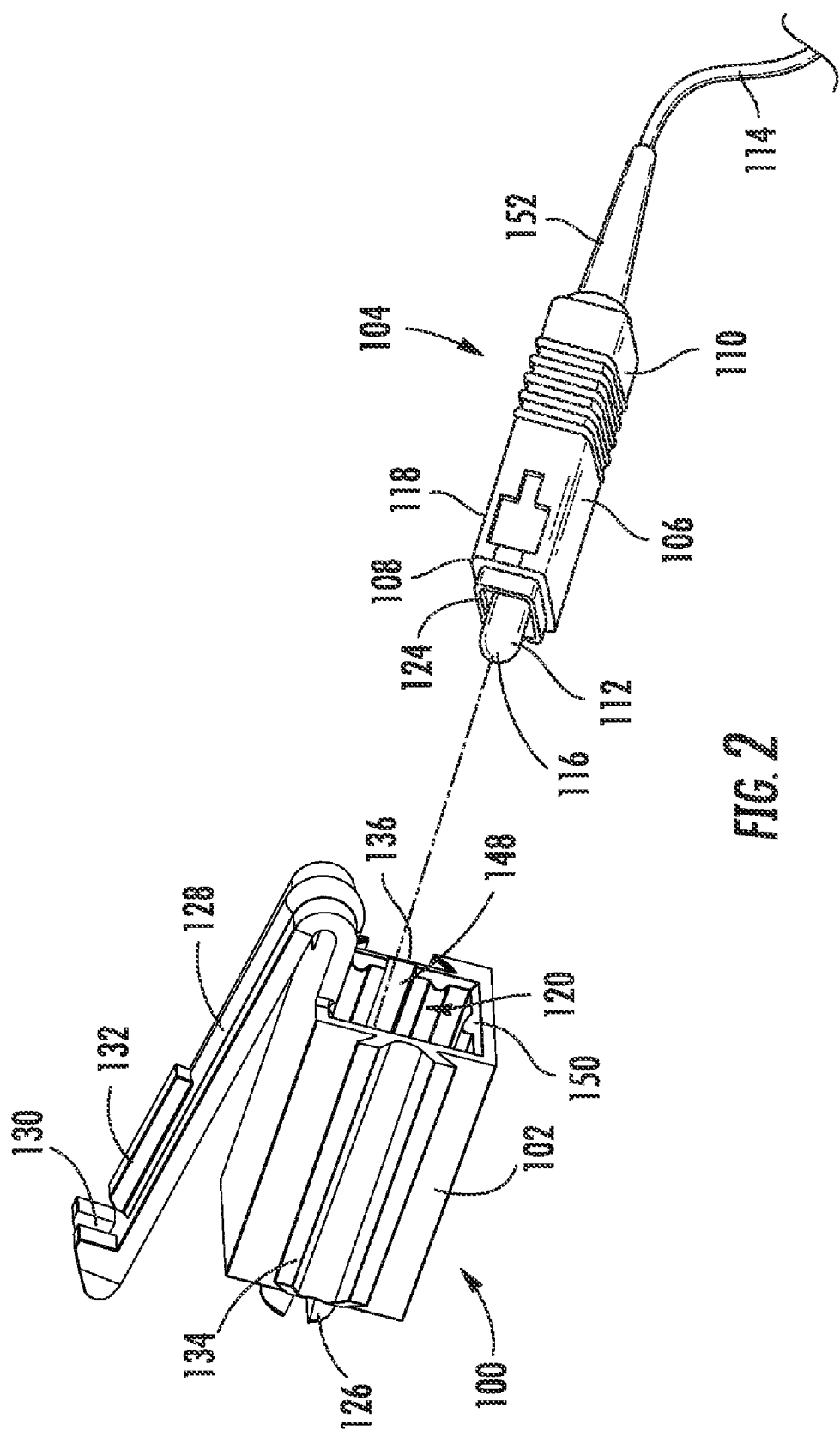
FIG. 2 is an exploded perspective view of a fiber optic assembly including the dust cap of FIG. 1.

FIG. 2 illustrates the dust cap 100 of FIG. 1 just before it is coupled to a fiber optic connector 104. As shown in FIG. 2, the fiber optic connector 104 includes a connector body 106 having a first end 108 and second end 110, and a ferrule 112 positioned at the first end 108 of the connector body 106. The ferrule 112 holds an optical fiber 114 having an end face 116. The boot 152 abuts the fiber optic connector 104 and couples the fiber optic connector 104 and/or the optical fiber 114. As noted above, the open end of the cavity 120 in the housing 102 is sized to receive and contact an outer surface 118 of the fiber optic connector body 106.

Figure 4:
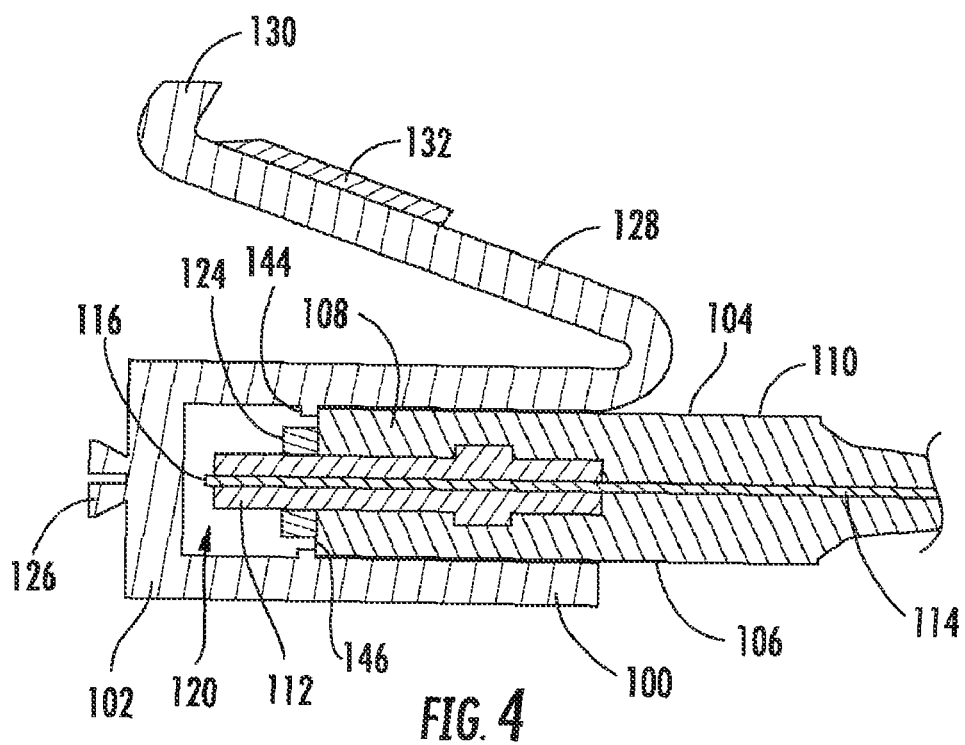
FIG. 4 is a cross-sectional view of the fiber optic assembly of FIG. 3, taken along line 4-4.

FIGS. 3 and 4 illustrate the dust cap 100 releasably coupled to the fiber optic connector 104. When so coupled, the housing 102 releasably engages the outer surface of the first end of the fiber optic connector body 106, encloses the end face 116 of the optical fiber 114, and protects the end face 116 of the optical fiber 114 (e.g., from contact by foreign objects, weather, etc). As best shown in FIG. 4, the housing 102 includes a shoulder 144 extending into the cavity 120. When the dust cap 100 is fully coupled to the fiber optic connector 104, the shoulder 144 engages an end face 146 of the connector body 106 and prevents the closed end of the cavity 120 from contacting the ferrule 112 or the end face 116 of the optical fiber 114. Still other embodiments of the dust cap may include a shoulder structured to releasably engage a connector hub 124.

FIGS. 5A and 5B illustrate the dust cap 100 releasably coupled to the fiber optic connector 104 and a support structure. More specifically, and as best shown in FIG. 5B, the dust cap's circular protuberance 126 is frictionally engaged with a generally circular aperture 140 in a panel 138. At the same time, a bias force is applied to the biased clip 128 to permit insertion of a catch 130 through a generally rectangular aperture 142 in the panel 138. The bias force is then removed from the biased clip 128, permitting the biased clip 128 to resiliently deflect back to its normal position with the panel 138 engaged between the catch 130 and a ridge 132 on the biased clip 128. Of course, the configuration of the support structure may be different in other embodiments, just as other types of mounting members may be employed on the dust cap 100. It should be clear from the above description that the dust cap 100 shown in FIG. 1 can be used not only to enclose and protect the end face of an optical fiber in a fiber optic connector, but also to support or "park" the protected fiber optic connector at the panel 138 (or another support structure such as a dust cap holder) until the fiber optic connector is placed into service. In the example shown in FIG. 5A, the panel 138 includes multiple circular apertures 140 and multiple rectangular apertures 142 for supporting or "parking" multiple dust caps 100 and fiber optic connectors 104 at the same time.

As shown in FIG. 6, the dust cap 100 can be decoupled from the panel 138 by pinching the biased clip 128 and the housing 102 together to deflect the biased clip 128 toward the housing 102 and disengage the catch 130 from the rectangular aperture 142. The dust cap 100 and the fiber optic connector 104 can then be separated from the panel 138 as an assembly, with the dust cap 100 still releasably coupled to the fiber optic connector 104. Following that, the dust cap 100 can be removed from the fiber optic connector 104 before (and preferably immediately prior to when) the fiber optic connector 104 is coupled to another fiber optic device, such as an optical adaptor for optically coupling a fiber optic connector to another fiber optic connector, a fiber optic splitter, etc. If desired, the dust cap 100 can then be re-parked in the panel 138, without the fiber optic connector 104, and possibly reused with another (or the same) fiber optic connector in the future. Alternatively, the fiber optic connector 104 can be decoupled from the dust cap 100 while the dust cap 100 is still coupled to the panel 138. As should be apparent, the method of unparking a fiber optic connector described above can be employed in a wide variety of fiber optic apparatuses for indoor or outdoor applications including fiber optic cabinets, fiber optic pedestals, fiber optic enclosures, fiber optic frames, etc.

FIG. 7A illustrates the dust cap 100 of FIG. 1 releasably engaged with an identical dust cap 100 via the tabs 134 and slots 136. In this manner, two or more dust caps 100 can be joined together before the dust caps 100 are coupled to fiber optic connectors (as shown in FIG. 7A) or after the dust caps 100 are coupled to fiber optic connectors. FIG. 7B illustrates the two dust caps 100 releasably coupled to fiber optic connectors 104 and to the panel 138 for parking the fiber optic connectors 104 until they are placed into service. As should be apparent, the dust caps 100 and the fiber optic connectors 104 may be coupled to and/or decoupled from the panel 138 as a group or individually, as desired.

FIG. 8 illustrates a dust cap 200 according to another example embodiment. The dust cap 200 shown in FIG. 8 is similar to the dust cap 100 shown in FIG. 1, and includes a housing 202 defining a cavity 204. In addition, and unlike the dust cap 100 of FIG. 1, the dust cap 200 of FIG. 8 includes a generally circular collar 206 protruding from the closed end 208 and toward the open end of the cavity 204. The collar 206 abuts the end face of a connector hub of a fiber optic connector (e.g., the connector hub 124 of fiber optic connector 104 shown in FIG. 4) to form a seal therebetween for preventing dust contamination or damage to the end face of an optical fiber. A different embodiment of a connector collar may be structured to engage an inner portion, an outer portion, and/or an end face of a connector hub. Further, different shapes and sizes of collars and connector hubs, complimentary and non-complimentary, may be included in other dust cap embodiments.

FIGS. 9A-C illustrate a dust cap 300 according to yet another example embodiment of this disclosure. As shown therein, the dust cap 300 includes a housing 302. The housing 302 is adapted to engage a first end 304 of the outer surface of a connector body 306 of a fiber optic connector 308 to protect an exposed end face of the optical fiber 309, as shown in FIG. 10. A second end of the connector body 306 abuts or couples to a boot 328 disposed about the optical fiber 309. The housing 302 also defines a tab 310 and a slot 312 for releasably engaging adjacent dust caps 300, as shown in FIG. 11. The dust cap 300 further includes a generally rectangular collar 322 and a closed end 324. The collar 322 is structured to contact an outer portion of a generally rectangular connector hub (not shown) of the fiber optic connector 308 and abut an end face of the fiber optic connector 308, to form a seal therebetween for protecting the end face of the optical fiber 309.

The dust cap 300 includes a mounting member 314 pivotally coupled to a top surface of the dust cap 300. The mounting member 314 includes a thumb portion 316 and an engagement portion 318. Applying a downward force on the thumb portion 316 causes the engagement portion 318 to pivot upwardly so it can engage a complementary support structure. A biasing member 326 is positioned below the thumb portion 316 and biases the mounting member 314 to its normal position, shown in FIG. 9, when no downward force is applied to the thumb portion 316.

FIG. 12 illustrates a bottom side of the engagement portion 318, which includes several generally rectangular projections 320 for engaging a complementary support structure. More specifically, the engagement portion 318 and its projections 320 are adapted to engage a depression 408 in a dust cap holder 402 as shown in FIG. 13. The dust cap holder 402 includes multiple depressions 408 for supporting multiple dust caps 400, as shown in FIGS. 14 and 15. The dust cap holder 402 further includes one or more apertures 404, 406 for attaching the dust cap holder 402 to another support structure. Of course, a variety of other dust cap holder configurations can be employed, if desired, without departing from the scope of this disclosure.

FIG. 16 illustrates a fiber optic assembly including a dust cap 500, a fiber optic connector 502, and a boot 510 abutting and/or coupled to the fiber optic connector 502 according to another example embodiment. The dust cap 500 is adapted to releasably engage an end of the connector body 512 of the fiber optic connector 502 to releasably couple the dust cap 500 to the fiber optic connector 502 and protect an end face of the optical fiber. In this embodiment, the dust cap 500 is not configured to engage an adjacent dust cap. The dust cap 500 includes a mounting member 506 for releasably engaging a slot 508 in a dust cap holder 504 to couple the dust cap 500 to the dust cap holder 504 and supporting the dust cap 500 and the fiber optic connector 502 from the dust cap holder 504. As shown in FIG. 16, the mounting member 506 and the slot 508 have a complimentary dovetail configuration.

As should be apparent, the teachings of the present disclosure can be applied to a variety of optical module assemblies to facilitate installation or connection of the optical module assemblies in fiber optic apparatuses.

FIG. 17 illustrates an optical module assembly 600 according to another example embodiment. As shown in FIG. 17, the optical module assembly 600 includes a housing 602 and several pigtails 604 extending from the housing 602 and terminated by fiber optic connectors 606. The housing 602 may enclose, e.g., a fiber optic splitter and/or other optical components, etc. Each fiber optic connector 606 is releasably coupled to a dust cap 610, and each dust cap 610 may be releasably coupled to one or more other dust caps 610. Additionally, each dust cap 610 includes at least one mounting member for releasably engaging a support structure (such as a panel, a dust cap holder, etc). Although not shown in FIG. 17, the optical module assembly 600 may further include a dust cap holder, with each dust cap 610 releasably coupled to the dust cap holder.

When the assembly 600 of FIG. 17 is installed in a fiber optic enclosure, the dust caps (or the dust cap holder, if applicable) can be readily coupled to a support structure to thereby park the multiple protected fiber optic connectors 606 at the same time. Alternatively, the dust caps 610 may not be coupled to one another so that, for example, each fiber optic connector 606 can be individually parked or coupled to another fiber optic device as desired.

An optical module assembly may also or alternatively include one or more dust caps each configured to releasably engage a connector body of a fiber optic connector and/or an adjacent dust cap according to the teachings provided herein.

FIGS. 18 and 19 illustrate fiber optic connector assemblies 700 according to yet another embodiment of the present disclosure. Each fiber optic assembly 700 includes a fiber optic connector 702 having two ends, a boot 706 abutting and/or coupled to the fiber optic connector 702, and an optical fiber 710. A ferrule (not shown) of the fiber optic connector 702 holds the optical fiber 710, and a dust cap 704 is mounted on the ferrule. The boot 706 includes a mounting member 708 for releasably coupling the boot 706—and any fiber optic connector 702 coupled to the boot 706 to a boot holder 712. In the embodiment of FIGS. 18 and 19, the mounting member includes a generally T-shaped tab 708 structured to releasably engage a slot 714 of the boot holder 712. When so engaged, the boot 706 and the boot holder 712 support the fiber optic connector 702, the dust cap 704, and the optical fiber 710 from a support structure 716.

Various examples of dust caps, fiber optic assemblies, and methods have been described above with reference to the figures. It should be understood, however, that the teachings of this disclosure are not limited to the specific examples shown in the figures or described above, and that a wide variety of other embodiments can be made without departing from the scope of this disclosure.

The foregoing description of exemplary embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

What is claimed:

1. A dust cap for protecting and supporting a fiber optic connector, the fiber optic connector including a connector body having a first end and second end and a ferrule positioned at the first end of the connector body, the ferrule holding an optical fiber having an end face, the dust cap including at least one mounting member for releasably coupling the dust cap to a support structure and a housing defining a cavity having an open end sized to receive at least the ferrule and the end face of the optical fiber, the mounting member movable between a first position and a second position, the mounting member supporting the dust cap and the fiber optic connector from the support structure when the dust cap is releasably coupled to the fiber optic connector with at least the ferrule and the end face of the optical fiber received in the open end of the cavity and the mounting member is releasably coupled to the support structure.

2. The dust cap of claim 1 further comprising an additional mounting member having at least one protuberance for releasably engaging the support structure.

3. The dust cap of claim 1 wherein the mounting member includes a biased clip for releasably engaging the support structure.

4. The dust cap of claim 1 wherein the dust cap has a monolithic construction.

5. The dust cap of claim 1 wherein the housing is configured to contact the connector body and avoid contact with the ferrule and the end face of the optical fiber when the dust cap is releasably coupled to the fiber optic connector.

6. The dust cap of claim 5 wherein the connector body includes an inner surface and an outer surface, and wherein the housing is adapted to releasably engage the outer surface of the connector body's first end.

7. A fiber optic assembly comprising a fiber optic connector including a connector body having a first end and second end and a ferrule positioned at the first end of the connector body, the ferrule holding an optical fiber having an end face, and a dust cap including a housing releasably coupled to the first end of the connector body and at least one mounting member for releasably coupling the dust cap to a support structure, the mounting member movable between a first position and a second position, the mounting member supporting the dust cap and the fiber optic connector from the support structure when the mounting member is releasably coupled to the support structure, the housing enclosing the end face of the optical fiber to protect the end face of the optical fiber.

8. The assembly of claim 7 further comprising the support structure, the mounting member releasably coupled to the support structure and supporting the dust cap and the fiber optic connector releasably coupled to the dust cap from the support structure.

9. A method of coupling an optical fiber of a fiber optic apparatus, the fiber optic apparatus including a support structure, at least one optical adapter, a dust cap and a fiber optic connector having a connector body with a first end and a ferrule extending from the first end of the connector body, the ferrule holding an optical fiber having an end face, the dust cap releasably coupled to the fiber optic connector to protect the end face of the optical fiber, the dust cap including at least one mounting member movable between a first position and a second position, the mounting member releasably engaging the support structure to support the dust cap and the fiber optic connector releasably coupled to the dust cap from the support structure, the method comprising moving the mounting member from the first position to the second position to disengage the mounting member from the support structure with the dust cap releasably coupled to the fiber optic connector, removing the dust cap from the fiber optic connector, and coupling the fiber optic connector to the at least one optical adapter.

10. The method of claim 9 wherein the support structure includes a dust cap holder.

11. The method of claim 9 further comprising reengaging the mounting member to the support structure without the fiber optic connector releasably coupled to the dust cap.

12. The assembly of claim 8 wherein the support structure includes a dust cap holder, and wherein the mounting member is releasably coupled to the dust cap holder.

13. The assembly of claim 8 wherein the support structure includes a panel, and wherein the mounting member is releasably coupled to the panel.

14. An optical module assembly comprising a housing and at least one pigtail extending from the housing and terminated by the fiber optic connector of the assembly of claim 7.

15. The assembly of claim 14 further comprising a fiber optic splitter within the optical module assembly housing.

16. An optical module assembly comprising a housing and at least one pigtail extending from the housing and terminated by the fiber optic connector of the assembly of claim 12.

17. The assembly of claim 16 further comprising a fiber optic splitter within the optical module assembly housing.

18. The assembly of claim 12 wherein the mounting member is pivotally coupled to the housing for pivotal movement between the first position and the second position.

19. The assembly of claim 18 wherein the mounting member includes a thumb portion and an engagement portion, and wherein a downward force on the thumb portion causes the engagement portion to pivot upwardly.

20. The assembly of claim 19 wherein the mounting member includes a biasing member for biasing the mounting member to the first position.

21. The assembly of claim 19 wherein the engagement portion includes a bottom side having at least one projection for engaging the dust cap holder.

22. The assembly of 21 wherein the dust cap holder includes a depression for engagement by the projection.

23. An optical module assembly comprising a housing, a fiber optic splitter within the housing, and at least one pigtail extending from the housing and terminated by the fiber optic connector of the assembly of claim 20.

24. The dust cap of claim 1 wherein the mounting member is pivotally coupled to the housing for pivotal movement between the first position and the second position.

25. The dust cap of claim 24 wherein the mounting member includes a thumb portion and an engagement portion, and wherein a downward force on the thumb portion causes the engagement portion to pivot upwardly.

26. The dust cap of claim 25 wherein the mounting member includes a biasing member for biasing the mounting member to the first position.

27. The dust cap of claim 25 wherein the engagement portion includes a bottom side having at least one projection for engaging a support structure.

28. A fiber optic assembly comprising a fiber optic connector including a connector body having a first end and second end and a ferrule positioned at the first end of the connector body, the ferrule holding an optical fiber having an end face, and a dust cap including a housing releasably coupled to the first end of the connector body and a mounting member for releasably coupling the dust cap to a support structure, the mounting member supporting the dust cap and the fiber optic connector from the support structure when the mounting member is releasably coupled to the support structure, the housing enclosing the end face of the optical fiber to protect the end face of the optical fiber, the housing dimensioned to contact the connector body and avoid contact with the ferrule and the end face of the optical fiber, the mounting member supporting the dust cap and the fiber optic connector from the support structure when the mounting member is releasably coupled to the support structure.

* * * * *